Figure 1:
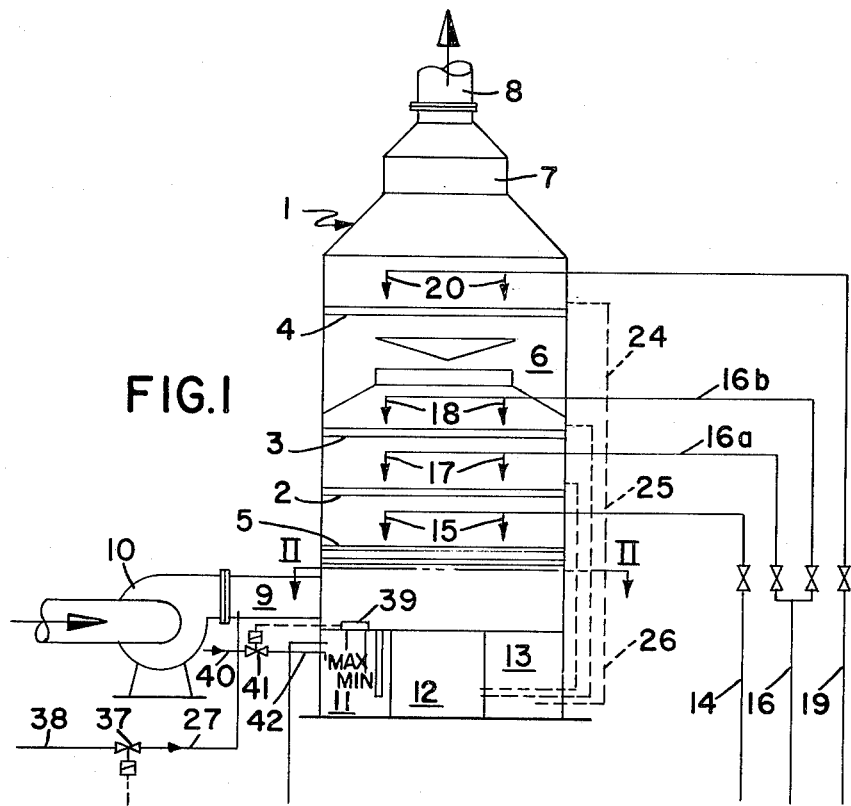

United States Patent [19]

Kötting

[11] 3,905,774

[45] Sept. 16, 1975

[54] APPARATUS FOR THE REMOVAL OF MALODOROUS COMPONENTS FROM GASES

[75] Inventor: Wolfgang Kötting, Koblenz, Germany

[73] Assignee: Steuler Industriewerke G.m.b.H., Hohr-Grenzhausen, Germany

[22] Filed: July 20, 1972

[21] Appl. No.: 273,398

[30] Foreign Application Priority Data
June 2, 1972 Germany............................ 2226955

[52] U.S. Cl. ...................... 23/283; 23/284; 55/233; 261/94; 423/210
[51] Int. Cl.² .......................................... B01J 10/00
[58] Field of Search.. 23/283, 230 R, 230 A, 252 R, 23/284; 261/94–99, 104, 107; 55/90, 233; 21/74 R

[56] References Cited

UNITED STATES PATENTS

| 1,410,249 | 3/1922 | Henderson et al. .................. 21/74 R |
| 1,725,925 | 8/1929 | Kent ..................................... 261/113 |
| 2,113,198 | 4/1938 | Nonhebel et al. ................... 423/242 |
| 2,234,385 | 3/1941 | Ryner .................................. 261/113 |
| 3,049,527 | 8/1962 | Powelson ........................ 261/114 R |
| 3,409,409 | 11/1968 | Sackett ................................ 23/283 |
| 3,411,864 | 11/1968 | Pallinger ............................ 423/210 |
| 3,593,497 | 7/1971 | Grimm et al. ................... 261/114 R |
| 3,665,677 | 5/1972 | Koch ..................................... 55/233 |

Primary Examiner—Earl C. Thomas
Attorney, Agent, or Firm—Norman S. Blodgett; Gerry A. Blodgett

[57] ABSTRACT

A process for the removal of malodorous particulate matter, decomposition products of organic substances in particular, entrained in waste gases or fumes.

6 Claims, 2 Drawing Figures

APPARATUS FOR THE REMOVAL OF MALODOROUS COMPONENTS FROM GASES

This invention relates to a process for the removal of malodorous particulate matter, decomposition products of organic substances in particular, entrained in waste gases and/or fumes.

The removal of malodorous particulate matter entrained in waste gases and/or fumes is especially difficult, because without resorting to very costly procedures it is often impossible to determine the precise chemical nature of the contaminants, if they are decomposition products of organic substances. Moreover, the industrial plants in which the odours occur frequently generate large volumes of exit air and it is often impossible to control or treat the offensive gases and/or fumes at their source. This applies, for instance, to plants for the utilization of by-products of slaughtering operations (blood, bones, inedible organs, hair and feathers) and for fish meal production, poultry farms, piggeries, hide and skin dressing departments, tanneries and factories for making carpets backed with synetic rubber dispersions.

The aforesaid large volumes of exit air needing to be cleaned at such plants frequently derive from the inability to control the malodorous waste gases and/or fumes at their source and from the constant ventilation needed to provide tolerable working conditions for the persons therein employed.

Malodorous particulate matter entrained in gas and/or fume emissions can be removed by combustion, by one of two methods, namely, direct flame combustion and catalytic combustion.

By the direct flame combustion method the odorous effluent gases and/or fumes are raised to temperatures in excess of 760°C., preferably to approximately 900°C. But as the calorific value of said effluent gases and fumes is extremely low, practically all the requisite heat to effect combustion must be supplied by fuel, usually oil. Consequently, this method is fairly costly. It is true that the costs of incineration can be reduced by utilizing waste heat through heat exchangers, but there are not always practical possibilities for so doing, and even if there are the capital costs of the requisite waste heat recovery equipment can be considerable.

By the catalytic combustion method the odorous waste gases and/or fumes are burned at temperatures from 350° to 450°C. The reduction in oxidation temperature compared with direct flame combustion is achieved by the use of catalysts. The savings in fuel permitted by the lower combustion temperatures are substantial but the costs of this method can be considerable, depending on the life of the catalyst. Many effluent gases or fumes from industrial or chemical processes contain catalyst poisons, sulphur and phosphorus in particular that greatly reduce catalytic activity. As the precise composition of the effluent gases is frequently not known or cannot be predicted, it is impossible to estimate the life of the catalysts to be employed. As very small amounts of gaseous poisons can have a drastic effect on the activity of the catalyst, the cost of employing this method can be fairly considerable.

This invention provides a low-cost means for eliminating malodorous particulate matter, together with low concentrations of odorous substances and odorous carrier substances contained in effluent gases and/or fumes. Said means takes the form of an absorption tower incorporating a plurality of capillary washing plates arranged one above the other in stages, with streams of washing fluid circulating thereupon at a variable level. The effluent gases and/or fumes with the entrained malodorous particulate matter are fed in from below under positive pressure and impinge upon the underside of the washing plates and penetrate the washing fluid. In the first stage the washing fluid is an approximately 2 to 6 percent solution of sodium hydroxide or potassium hydroxide. A quantity of chlorine, determined by the chloroxidizable portion of the entrained contaminants is added to the effluent gases and/or fumes before they enter the first washing stage, so that in the second washing stage the fluid consists of an approximately 3 to 8 percent solution of sodium hydroxide or potassium hydroxide and that in the third washing stage the washing fluid consists of an approximately 0.5 to 8 percent amino-sulfo acid ($NH_2SO_3H$) also called sulfamic acid.

Part of the odorous substances and odorous carrier substances, depending on the quantity of chlorine added in proportion to the chloroxidizable content of the effluent gases and/or fumes, oxidizes on the way from the inlet point to the entry of the first washing stage. The chlorine that does not enter into this step of the chemical reaction combines with the sodium hydroxide in the first alkaline washing stage to sodium hypochlorite (NaOCl) or with the potassium hydroxide to potassium hypochlorite (KOCl). This hypochlorite solution oxidizes further components of the effluent gases and/or fumes. At the same time the thus removed odorous components are combined with the washing liquid. Reaction of the non-consumed portion of chlorine with the alkaline solution also prevents the escape of free chlorine from the absorption tower. In the second stage, in which the washing liquid is also a solution of sodium hydroxide or potassium hydroxide, the treatment performed in the first washing stage is supplemented, thereby increasing the rate of precipitation. This stage also serves as a safety stage for non-consumed chlorine. That part of the chlorine that does not enter into the reaction in the first stage in this stage completely combines with the sodium hydroxide or potassium hydroxide solution, thereby dependably ensuring that no free chlorine can escape from the absorption apparatus.

Here the invention additionally provides for measurement of the oxidation potential to permit the amount of chlorine added to be regulated to the optimum value with the aid of known measuring and controlling means. Before entering the third washing stage the precleaned gas passes through a stripper, which on the one hand prevents alkaline components from the first and second stages from being entrained in the third, acid washing stage and thus increasing the consumption of amino-sulfo acid; on the other hand it prevents amino-sulfo acid in the third washing stage from flowing into the second, alkaline stage where it would increase the consumption of sodium hydroxide or potassium hydroxide solution.

After passing through the stripper the effluent gas enters the third washing stage. In this stage the malodorous components, mainly of a basic nature, that were not removed in the first two washing stages, are absorbed by the amino-sulfo acid. Finally, the effluent gases and/or fumes are discharged into atmosphere through a separator that removes entrained droplets.

The washing media are circulated from a storage container by known means and normally provide for operation for a specific period, after which they must be renewed. But with the aid of suitable control and regulating means the washing fluids can be continuously and automatically renewed. The spent washing fluids from the three stages are mixed together in discharge outlets and are thereby neutralized. After the pH value has been adjusted to the requisite 6 to 9, they are discharged into a clarification plant.

Apart from the aforementioned reagents, the most important factor for effective absorption is the intensive mixing of the gas and absorption fluid, deriving from the use of capillary washing plates. These provide for the largest possible reaction surface, as they incorporate plastic capillary tubes having a free diameter or bore ranging from 0.2 mm to 2 mm, which positively distribute the gas in extremely fine form, thereby intensively mixing it with the fluid on the capillary washing plate. As the stream of gas or fume impinges on the underside of the plates, the washing fluid is prevented from dropping through the capillary tubes, which cannot therefore get blocked. For special applications the capillary tubes in the lowest washing plate can be of larger diameter than those in the plates in the stages thereabove, or said stages can take the form of fine-mesh sieve or plastic perforated plates arranged one above the other, which retain any particles of solid matter or fat components entrained in the gases or vapours.

Figure 2:
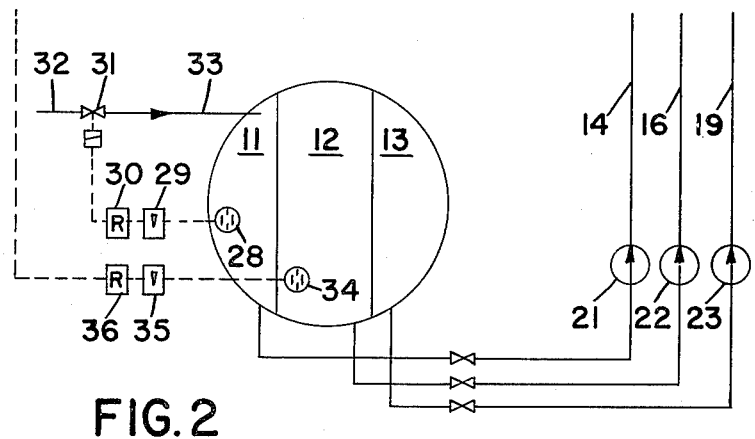

FIG. 1 is a vertical sectional view of apparatus embodying the principle of the present invention, and FIG. 2 is a horizontal sectional view of the invention taken on the line II—II of FIG. 1.

The apparatus or absorption tower 1 has three capillary washing plates 2, 3 and 4 one above the other and therebelow a double sieve plate 5. In the top tapered outlet section of the tower is a separator for entrained droplets 7 and therebelow the discharge outlet 8. The effluent gases and/or fumes are by means of exhauster 10 fed into the tower 1 in the direction indicated by the arrow through the inlet 9 underneath the double sieve plate 5. In the base of the tower are three compartments 11, 12 and 13 for the storage of the washing fluid for each of the individual washing stages. A feed pipe 14 runs from the reservoir 11 to nozzles 15 installed above the double sieve plate 5, and from reservoir 12 runs a second feed pipe 16, whose two branches 16a and 16b connect nozzles 17 and 18 above capillary plates 2 and 3, which together form the second washing stage. A third feed pipe 19 connects the reservoir 13 with the nozzles 20 above capillary plate 4, which forms the third and final washing stage. Three pumps 21, 22 and 23 are provided, one each for the three circuits. The washing fluid rising above the present level on the washing plates drains to the reservoirs 12 and 13 through return pipes 24, 25 and 26, respectively, and the washing fluid that seeps through the double sieve plate 5 flows back to reservoir 11 direct. Chlorine is fed through pipe 27 into the inlet 9 in the direction indicated by the arrow.

The concentration of the sodium hydroxide solution circulated in the first washing stage from reservoir 11 is controlled according to the pH value. Continuous pH measurement is effected by the electrode assembly 28 which through the amplifier 29 and controller 30 regulates the flow of fresh sodium hydroxide solution from a storage tank through pipe 32 and solenoid-operated valve 31 into pipe 33 connecting with reservoir 11.

The optimum amount of chlorine required for the process is controlled by measuring the oxidation potential in the second washing circuit. The oxidation potential is measured by redox electrode assembly 34 in reservoir 12 and by means of amplifier 35 and controller 36 the volume of chlorine is regulated by solenoid-operated valve 37. The chlorine is drawn from steel cylinders through pipe 38 and is fed into inlet 9 through pipe 27.

As the effluent gas stream can absorb some of the alkaline fluid in the first washing circuit, a level controller is fitted in reservoir 11. When the level of washing fluid sink to the permissible minimum, detector 39 causes the solenoid-operated valve 41 to be energized and fresh water flows from supply line 40 through pipe 42 into the reservoir 11 until the maximum permissble level is reached when solenoid-operated valve 41 is closed. Reservoir 11 is also provided with an overflow through which make-up water can be fed in the event of the level control system being out of order.

As will be seen in the illustration, the effluent gas enters the absorption tower 1 at inlet 9, impinges upon the underside of double sieve plate 5 and is thereby freed of entrained solids and fat components. Thereupon it is subjected to a first washing operation by sodium hydroxide solution sprayed through nozzles 15, flowing on plate 5 and through the screen apertures in plate 5.

Then the precleaned gas impinges upon the capillary plate 2, passing therethrough and penetrating the film of fresh sodium hydroxide solution flowing thereupon, after which it enters the next capillary plate 3, where it is subjected to another similar washing procedure. The gas now containing only those malodorous components that are substantially basic, next passes through the stripper 6 underneath capillary plate 4, upon which amino-sulfo acid is applied through nozzles 20 and which absorbs said components. Finally, the cleaned and odourless gas passes through separator 7 which removes entrained droplets, and is discharged to atmosphere through outlet 8.

I claim:

1. Apparatus for the removal of malodorous components, decomposition products of organic substantances in particular, from effluent gas streams, comprising:
   a. a first, a second, and a third capillary washing plate, the plates being arranged in stages one above another, and being gas permeable,
   b. a conduit surrounding the washing plates and confining the flow of an effluent gas stream to a path through the plates,
   c. an inlet on the conduit adapted to admit the effluent gas stream into the conduit below the first plate,
   d. a discharge outlet on the conduit adapted to exhaust the effluent gas stream from the conduit above the third plate,
   e. a first pool of a washing fluid containing approximately 2 to 6 percent of a solute chosen from the group consisting of sodium hydroxide, potassium hydroxide, and mixtures thereof, positioned on the first plate, the plate and pool defining a first washing stage, f. a second pool of washing fluid containing approximately 3 to 8 percent solution of solute chosen from the group consisting of sodium hydroxide, potassium hydroxide, and mixtures thereof, positioned on the second plate, the plate and pool defining a second washing stage, g. a third pool of a washing fluid containing approximately 0.5 to 8 percent sulfamic acid ($NH_2SO_3H$), positioned on the third plate, the plate and pool defining a third washing stage, h. means for directing the stream upwardly through the plates and pools, i. injecting means adapted to inject chlorine into the stream before the stream passes through the plates and pools, j. control means responsive to the proportion of components in the stream that can be oxidized with chlorine, to control the amount of chlorine injected into the stream, and k. level means associated with each plate to control the quantity of washing fluid on each plate.

2. Apparatus as recited in claim 1, wherein a stripper that prevents transfer between plates of washing fluid entrained in the stream and washing fluid leaking through the plates, is positioned between the second and third plates.

3. Apparatus as recited in claim 1, characterized by means causing the spent washing fluid from the three stages to be neutralized by being mixed together and are subsequently clarified by known means.

4. Apparatus as recited in claim 1, characterized by the fact that each plate has formed in it a plurality of capillaries and the free diameter of the capillaries in the plate of the first washing stage is substantially larger than that in the plates of the other washing stages.

5. Apparatus as recited in claim 1, characterized by a washing plate in the first washing stage comprised of fine-mesh sieves of perforated plates of plastic placed one upon the other.

6. Apparatus as recited in claim 1, wherein the control means includes a redox measuring means associated with the second pool.

\* \* \* \* \*